United States Patent [19]

Hilliard et al.

[11] 4,111,081

[45] Sep. 5, 1978

[54] LOW NON-LINEARITY FACTOR SOUND ATTENUATING LAMINATE

[75] Inventors: Lonnie George Hilliard, Kent; Juris Verzemnieks, Puyallup, both of Wash.

[73] Assignee: The Boeing Company, Seattle, Wash.

[21] Appl. No.: 646,347

[22] Filed: Jan. 2, 1976

[51] Int. Cl.² ........................................... G10K 11/04
[52] U.S. Cl. ................................. 181/290; 181/210; 181/222; 181/287
[58] Field of Search ...................... 181/33 G, 210, 222, 181/286, 287, 290

[56] References Cited

U.S. PATENT DOCUMENTS

| | | | |
|---|---|---|---|
| 2,668,348 | 2/1954 | Hubbell | 181/33 G |
| 2,910,763 | 11/1959 | Lauterbach | 181/33 G |
| 3,211,253 | 10/1965 | Gonzalez | 181/33 G |
| 3,216,167 | 11/1965 | Roberts et al. | 181/33 G |
| 3,274,046 | 9/1966 | Shannon et al. | 181/33 G |
| 3,622,430 | 11/1971 | Jurisich | 181/33 G |
| 3,712,846 | 1/1973 | Daniels et al. | 181/33 G |

*Primary Examiner*—Brooks H. Hunt
*Attorney, Agent, or Firm*—Christensen, O'Connor, Johnson & Kindness

[57] ABSTRACT

A sound attenuating laminate exhibiting a relatively low change in acoustic resistance with respect to particle velocity is disclosed. The laminate includes a gas permeable mat of randomly arranged, small diameter filaments interleaved between two layers of resin impregnated, open weave web or cloth. A predetermined pattern of adhesive applied to the filamentous mat penetrates the mat to bond the laminate into an integral structure. The laminate can be easily fabricated to form sound attenuating panels having a variety of contours by curing the composite within a mold.

3 Claims, 5 Drawing Figures

U.S. Patent  Sept. 5, 1978  4,111,081
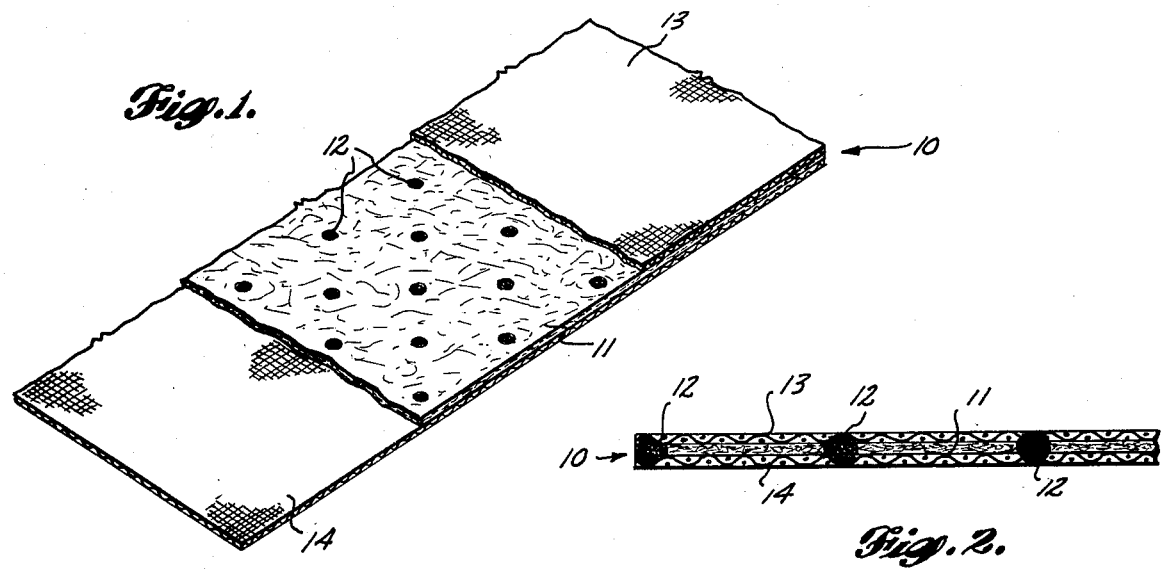
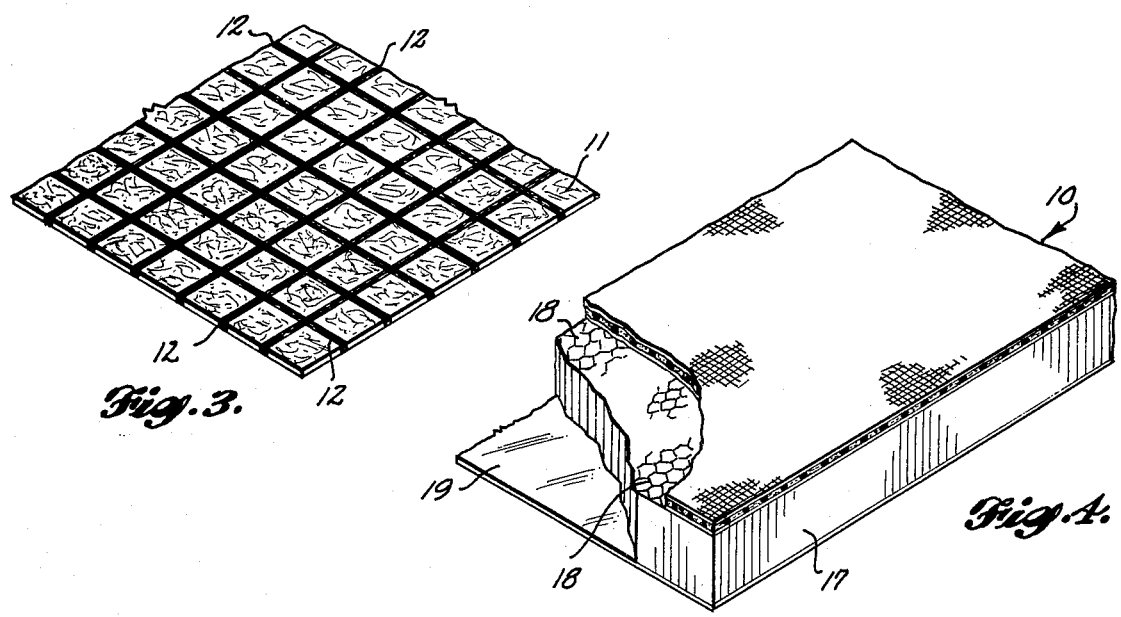
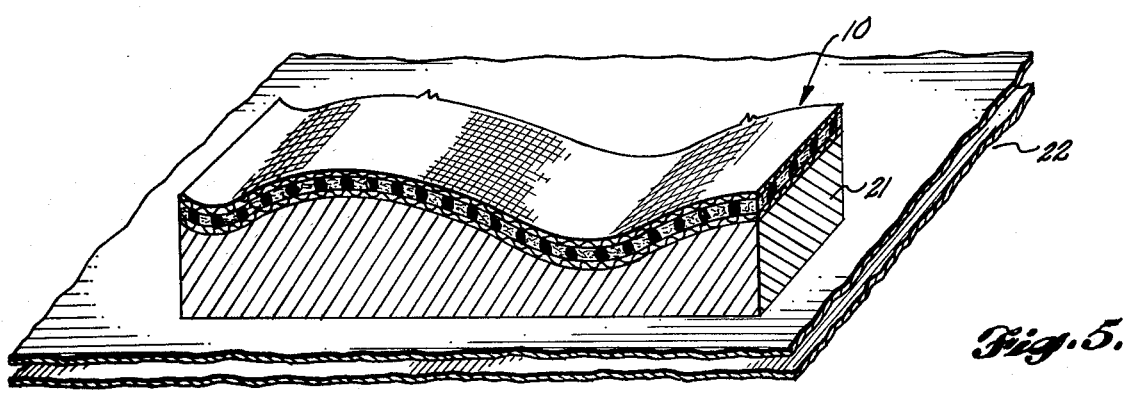

LOW NON-LINEARITY FACTOR SOUND ATTENUATING LAMINATE

BACKGROUND OF THE INVENTION

This invention relates to sound attenuating materials. More particularly, this invention relates to sound attenuating materials for use in situations in which the velocity of the gas particles impinging on the sound absorbing material varies over a substantial velocity range.

In many situations it is desirable or necessary to attenuate sound waves that are travelling within a moving media. To be effective in such an application, sound attenuating materials must not only be capable of satisfactory attenuation of impinging sound waves, but must also be capable of permeation by the moving media. Such applications are often complicated by the fact that the media may be moving at a particular velocity during one period of time and may be moving at substantially different velocity during some other time period. Further, the moving media may not exhibit a uniform velocity over the region in which the sound attenuating material is located.

For example, sound attenuating material utilized to provide noise suppression in the inlet ducts of jet aircraft engines is not only subjected to the sound waves which constitute the noise, but is also subjected to high velocity of air flowing through the inlet duct. The velocity of the air is not constant but varies with such parameters as engine speed. Further, due to the construction of conventional inlet ducts, the velocity of the air impinging on one region of such a sound attenuating material may be substantially different than the velocity of the air impinging on other regions of the same sound attenuator. Additionally, such a sound attenuating material is subjected to a variety of contaminants such as particulate matter carried by the air and other external factors such as abrasive forces due to the particulate matter carried in the turbulent airflow and high level sonic stress due to the high velocity of the air travelling through the inlet duct.

The performance of a sound attenuating material under conditions in which the velocity of the gas or fluid impinging on the material varies over a substantial velocity range is often described in terms of the material non-linearity. Non-linearity in this context being the ratio of the change in specific airflow resistance to a change in the velocity of the gas or fluid impinging on the material.

In the prior art, sound attenuating materials exhibiting relatively low non-linearity have generally comprised a laminated structure including a porous woven fiberglass material or a metal structure, such as a perforated metal sheet or a woven metal mesh, that is bonded to one surface of a core material having an air impervious layer bonded to the outer surface. The core material includes a large number of cavities that are open to the acoustic energy passing through the porous covering material. Incident sound energy is partially dissipated by the porous covering material and further dissipated within the core cavities.

Although the prior art structure, especially those sound attenuators utilizing a porous metallic covering, have been partially effective, the prior art has not achieved a sound attenuating material exhibiting a sufficiently low non-linearity and a high tolerance to the deleterious effects of the surrounding environment.

Accordingly, it is an object of this invention to provide a sound attenuating material that exhibits low non-linearity.

It is another object of this invention to realize a low non-linearity sound attenuating composite that is highly resistant to contamination, abrasion, and sonic fatigue.

It is yet another object of this invention to realize a low non-linearity sound attenuating laminate that can be economically manufactured and easily fabricated as sound attenuating panels having surfaces of compound curvature.

SUMMARY OF THE INVENTION

These and other objects are achieved in accordance with this invention by a laminate comprising a thin, gas permeable mat of randomly oriented filaments that is interleaved between open weave webs or cloth layers that are impregnated with a resinous compound. The layers of the laminate are permanently bonded to one another by an adhesive that is applied to the filamentous mat in a predetermined pattern to penetrate through specific portions of the mat. In the fabrication of the laminate of this invention, the composite structure is preferably placed in a mold within a vacuum bag before the adhesive is cured or set. The air is evacuated from the vaccum bag to uniformly force the composite against the mold surface. The material is then cured until the composite sets as a rigid or semirigid integral structure.

Laminates structured in accordance with this invention, exhibit low non-linearity that is often three times lower than typical prior art structures. The filamentous mat, which provides the low non-linearity, is protected by the resin impregnated cloth layers preventing abrasion damage or contamination by foreign material such as soot or dust. Further, the fabrication techniques made possible by the structural arrangement of this invention can be utilized to form rugged acoustical attenuators having a wide range of configurations. In addition, the sound absorbent laminate of this invention is light weight, a property which enhances the value of the laminate with respect to airborne applications and other situations in which weight is of prime consideration.

BRIEF DESCRIPTION OF THE DRAWINGS

FIG. 1 is a fragmentary isometric view of a laminate constructed in accordance with this invention, with sections of the individual layers broken away;

FIG. 2 is a cross-sectional view of a laminate in accordance with this invention;

FIG. 3 is an isometric view of a filamentous mat that depicts one adhesive pattern that can be employed in the practice of this invention;

FIG. 4 depicts a fragmentary isometric view of a sound attenuating composite in combination with a cellular core material and gas impervious back plate to form a sound attenuating panel; and FIG. 5 is an isometric view illustrating a mold and vacuum bag arrangement useful in fabricating the noise attenuating laminate of this invention.

DETAILED DESCRIPTION

Referring to FIGS. 1 and 2, sound attenuating laminate 10 comprises a thin filamentous mat of randomly oriented fibers 11 interposed between first and second resin impregnated gas permeable webs, 13 and 14. Mat 11 includes an array of adhesive regions 12 that permanently bond mat 11 and webs 13 and 14 into a rigid or semi-rigid laminate. Generally, mat 11 is commensurate in area with webs 13 and 14 and adhesive 12 is applied to the mat in a predetermined pattern or array such as the array of circular adhesive regions depicted in FIG. 1 prior to placing the mat 11 between webs 13 and 14.

Mat 11 is a gas permeable mat of small diameter filaments that are randomly arranged and loosely bonded together to form a cloth-like material. The filaments forming mat 11 can be either continuous or noncontinuous and mat 11 generally exhibits a uniform density per unit area. Such a gas permeable mat of fiberglass filaments is commercially known as surfacing veil and is available from Burlington Mills or Owens Corning Glass Company.

Webs 13 and 14 are a plain cloth mateial such as woven fiberglass. Each web 13 and 14 is impregnated with a resinous coating that encapsulates each fiber without filling the small openings between the fibers prior to assembling laminate 10. One example of such woven web material, impregnated with a fiberglass resin coating of the polyimide variety, is commercially available from the Dupont Company under the trade name Pyralin.

Adhesive 12 is a resinous material such as a polyimide resin that is in a liquid state when applied and is air cured or heat cured to form a permanent bond between mat 11 and webs 13 and 14. The viscosity of adhesive 12 is controlled during the fabrication of sound attenuating laminate 10 so that the adhesive penetrates mat 11 to form vitually identical adhesive patterns on both surfaces of mat 11. In addition, the viscosity is controlled such that little or no lateral flow of the adhesive occurs within mat 11 and webs 13 and 14 during the bonding process. As shown in FIG. 2, adhesive 12 at least partially penetrates the open weave of mats 13 and 14 to bond the structure into an integral composite sheet. One satisfactory adhesive resin is commercially available from American Cyanimide Company as a compound number BR 34B-18.

FIG. 3 depicts another adhesive pattern or array that can be employed in the practice of this invention. In FIG. 3, adhesive 12 is applied as two sets of thin, elongated substantially parallel strips with one set of strips essentially perpendicular to the second set of strips to form a rectangular adhesive array on ech surface of mat 11. A number of adhesive patterns other than those depicted in FIGS. 1 and 3 may be employed in the practice of this invention. The area of mat 11 that is covered by adhesive 12 may be adjusted to accommodate structural considerations. For example, in acoustic attenuators that are to be subjected to considerable operational stress forces or in embodiments in which the laminate is to be formed into a part having complex curvatures, it may be desirable or necessary to impregnate a fairly substantial area of mat 11 with adhesive 12. It should be realized, however, that the open area of the laminate is maintained as large as possible in view of the structural requirements in order to preserve the low non-linearity characteristic.

When the sound-carrying gas particles impinge on one surface of sound attenuating laminate 10, e.g. web 13, a portion of the impinging particles enter the interior of the laminate through the small open areas of the woven web material, and a portion of the impinging particles are reflected from the resin coated fibers that form the web. Those particles entering through the openings in the web travel through mat 11, generally following a path determined by the arrangement of the filaments in that particular locality. As each particle travels through the surface web and through mat 11, energy is dissipated to at least partially attenuate the sound. If the energy of a particular particle is not totally dissipated, the particle either exits through an opening in the second surface web, e.g. web 14, or is reflected back into mat 11 from a resin coated fiber of the second web. Regardless of the exact path each particle follows, the energy dissipated within laminate 10 substantially attenuates the impinging sound.

Mat 11 and webs 13 and 14 are generally selected to control the acoustic resistance of sound attenuating laminate 10 and also to control the frequency range over which the attenuation takes place. Generally speaking, utilizing a mat 11 having larger diameter filaments or less density per unit area normally results in a lower acoustic resistance and lower non-linearity. In a similar manner, utilizing a coarser weave material for webs 13 and 14 generally results in a lower acoustic resistance and lower non-linearity. Further, although webs 13 and 14 are depicted in FIGS. 1 and 2 as consisting of a single layer of cloth material, webs 13 and 14 may include several cloth layers all impregnated with a resin and cured to form an integral web. Since such a web is normally less porous than a web constructed with a single cloth layer, a multiple cloth layer web ordinarily results in a higher acoustic resistance.

One realization of the embodiment of FIG. 1 included webs 13 and 14 constructed of a single layer of Dupont Pyralin P. G. 6100 impregnated fiberglass cloth, a mat 11 constructed of the previously mentioned surfacing veil with filament diameters less than 0.0003 inches and an array of circular adhesive regions 12 formed by the previously mentioned BR 34B-18 resin with approximately 10 per cent of the surface area of the mat covered by the adhesive. It was determined that the acoustic resistance of this realization varied from approximately 52 Rayls to 76 Rayls over the particle velocity range of 20 to 150 cm/sec.

FIG. 4 depicts the use of a low non-linearity laminate 10 in a noise attenuating panel. In FIG. 4, laminate 10, such as the embodiment of this invention depicted in FIGS. 1 and 2, is bonded to core 17. Core 17 is a rigid or semirigid structural panel that includes a large number of small cavities 18 formed by partitioning the interior of core 17. Each cavity extends between the two surfaces of core 17 and is open to gas particles travelling through sound attenuating laminate 10. A gas impervious sheet 19 is bonded to the lower surface of core 18 to form the end walls of cavities 18. Often core 17 is a material commonly identified as honeycomb panel that is partitioned into hexagonal cavities. In operation, laminate 10 dissipates a substantial portion of the acoustic energy incident on the surface of the noise attenuating panel (as previouly described) and cavities 18 act as classic hard-walled terminated tubes to dissipate acoustic energy passing through laminate 10.

The low non-linearity acoustically absorbent laminate and the sound attenuating panel of this invention may be readily fabricated by impregnating predetermined portions of a filamentous mat with an adhesive. If desired or necessary, the adhesive can be partially cured to prevent wicking or lateral spreading of the adhesive within mat 11, web 13 and web 14 during the ensuing manufacturing steps. The adhesive coated mat is then sandwiched between layers of open weave cloth that have been previously impregnated with a resin and then cured. The composite structure formed by the impregnated cloth layers and adhesive impregnated mat is placed on a mold shaped to correspond to the desired final laminate configuration. A slight pressure is then exerted between the surface of the laminate and the mold surface to ensure penetration of the adhesive into the weave of both resin impregnated cloth layers. One advantageous method of exerting the desired pressure is depicted in FIG. 5 which illustrates laminate 10 placed on mold 21 within vacuum bag 22. Vacuum bag 22 is any convenient enclosure or bag which is constructed of flexible material. As the air is removed from vacuum bag 22 by conventional evacuation means (not shown in FIG. 5) the walls of vacuum bag 22 are drawn against laminate 10 and mold 21 to press laminate 10 against the surface of mold 21. Vacuum is normally maintained until adhesive 12 has cured, thereby bonding the layers of laminate 10 into an essentially integral composite having substantially the same surface contour as that of mold 21. If desired or necessary, vacuum bag 22 and mold 21 may be placed within an oven or temperature chamber to ensure the proper curing conditions for the particular adhesive utilized. To form a noise attenuating panel such as the embodiment of FIG. 4, the cured laminate is then bonded to one surface of a core material and an air impervious sheet is bonded to the second surface.

What is claimed is:

1. A low non-linearity sound absorbent material for attenuating sound energy propagating through a moving gaseous media, said sound absorbent material comprising:

a first and second web having a plurality of filaments interwoven with one another to form an open weave cloth-like material having openings defined between adjacent interwoven filaments thereof, said first and second webs being resin impregnated to encapsulate each of said interwoven filaments without filling said openings between said interwoven filaments; and, a relatively thin filamentous mat of randomly oriented fibers interposed between said first and second webs, said filamentous mat including a predetermined pattern of adhesive, said adhesive penetrating through said mat and into said openings between said interwoven filaments of said first and second webs in each region of said first and second webs that is immediately adjacent to said predetermined adhesive pattern of said filamentous mat without substantial penetration of regions of said first and second webs that are not immediately adjacent to said predetermined adhesive pattern, said resin being cured to permanently bond said mat to said first and second webs.

2. The sound absorbent material of claim 1, wherein said adhesive is a polyimide resin applied to said mat to form said predetermined pattern of curable adhesive.

3. A sound attenuating panel comprising:

a structural core layer having first and second surfaces, said core layer including a plurality of open cells passing between said first and second surfaces;

a gas impervious sheet bonded to said first surface of said core layer to close one end of each of said cells; and a low non-linearity sound absorbent laminate bonded to said second surface of said core layer, said sound absorbent laminate including first and second layers of open weave cloth each having a plurality of interwoven resin impregnated fibers and a thin cloth-like filamentous mat interleaved betwen said first and second cloth layers, said mat impregnated with resin over predetermined areas thereof to define a predetermined pattern of resin for bonding said mat to each of said first and second resin impregnated cloth layers.

* * * * *